United States Patent [19]

Sahatjian et al.

[11] Patent Number: 4,943,473
[45] Date of Patent: Jul. 24, 1990

[54] FLEXIBLE LAMINATED FLUOROPOLYMER-CONTAINING COMPOSITES

[75] Inventors: Ronald A. Sahatjian, Lexington, Mass.; Robert C. Ribbins, III, Amherst; Mark G. Steckel, Manchester, both of N.H.

[73] Assignee: Chemical Fabrics Corporation, Merrimack, N.H.

[21] Appl. No.: 253,255

[22] Filed: Oct. 4, 1988

Related U.S. Application Data

[63] Continuation of Ser. No. 734,977, May 16, 1985, abandoned.

[51] Int. Cl.⁵ .................. B32B 7/12; B32B 17/10; B32B 27/08
[52] U.S. Cl. .................... 428/245; 428/247; 428/252; 428/334; 428/421; 428/422
[58] Field of Search ............ 428/421, 422, 245, 198, 428/212, 247, 315, 224, 252, 334; 2/79

[56] References Cited

U.S. PATENT DOCUMENTS

| | | | |
|---|---|---|---|
| 3,513,064 | 5/1970 | Westley | 428/252 |
| 3,579,370 | 5/1971 | Punderson et al. | 428/422 |
| 3,899,622 | 8/1975 | Geiger | 428/245 |
| 4,013,812 | 3/1977 | Geiger | 428/245 |
| 4,165,404 | 8/1979 | Ouehl | 428/212 |
| 4,168,298 | 9/1979 | Fitzgerald | 428/224 |
| 4,194,041 | 3/1980 | Gore et al. | 428/315 |
| 4,272,851 | 6/1981 | Goldstein | 2/79 |
| 4,347,268 | 8/1982 | Close | 428/422 |
| 4,399,183 | 8/1983 | Withers | 428/422 |
| 4,421,878 | 12/1983 | Close | 428/422 X |
| 4,423,183 | 12/1983 | Close | 428/422 X |
| 4,443,511 | 4/1984 | Worden et al. | 428/198 |
| 4,452,848 | 6/1984 | Geiger | 428/247 |
| 4,487,878 | 12/1984 | Vasta | 428/422 |
| 4,490,501 | 12/1984 | Vasta | 428/421 |
| 4,495,247 | 1/1985 | Vasta | 428/421 |
| 4,495,248 | 1/1985 | Vasta | 428/422 |
| 4,506,054 | 3/1985 | Vasta | 428/422 |
| 4,555,543 | 11/1985 | Effenberger et al. | 428/422 X |
| 4,610,918 | 9/1986 | Effenberger et al. | 428/421 X |
| 4,770,927 | 9/1988 | Effenberger et al. | 428/245 |

*Primary Examiner*—Thomas J. Herbert
*Attorney, Agent, or Firm*—White & Case

[57] ABSTRACT

Fire and chemical resistant, flexible composites are made from flexible woven, non-woven and knitted substrates and fluoropolymer containing films. Adhesives, such as melt adhesives, may be used in making the composites. The composites are suitable for use in protective garments, and in other articles where flexible chemically resistant materials are needed. A seaming technique for use in protective articles is described.

16 Claims, 1 Drawing Sheet

FIG. 1
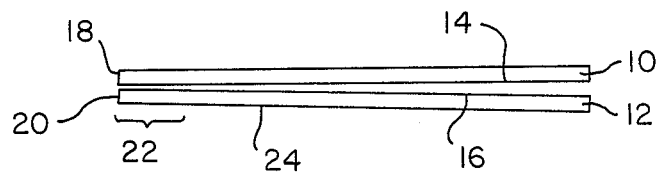
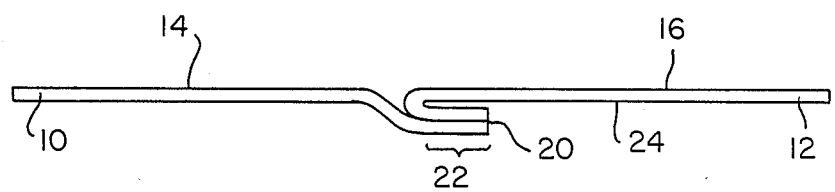
FIG. 2

FLEXIBLE LAMINATED FLUOROPOLYMER-CONTAINING COMPOSITES

This application is a continuation of application Ser. No. 734,977 filed on May 16, 1985, now abandoned.

BACKGROUND OF THE INVENTION

This invention relates to flexible fluoropolymer-containing composites, to a method of making the composites by film lamination techniques, and to protective garments and other articles made from such novel composites, as well as to a method for making such articles. Articles made with composites according to this invention are chemically resistant and the composites are sufficiently flexible to permit fabrication of protective garments. Fire resistant composites can also be made.

Protective garments are currently available which provide some measure of chemical protection. These garments can be made from non-woven spun-bonded polyethylene (Tyvek) or polyester (Sontara), and from laminates of Tyvek with polyethylene or Saran. Other materials, such as butyl or neoprene elastomers, fluoroelastomers and chlorinated polyethylene can also be used in protective garments. For example, U.S. Pats. Nos. 4,421,878 and 4,423,183 teach that cured fluoroelastomer films (Viton) may be useful as a coating in safety apparel. Each of these materials, however, is permeable to or degraded by some classes of chemicals. They are not resistant to the complete spectrum of toxic and hazardous materials potentially encountered in hostile environments. Moreover, garments of these materials require flame resistant oversuits where both chemical and fire protection are necessary. Elastomeric materials, such as Viton or butyl rubber, are irreversibly contaminated by some hazardous materials, such as nitrobenzene and cannot be cleaned Furthermore, the barrier properties of these materials are detrimentally affected by decontamination, and therefore articles made of these materials are not suitable for reuse.

U.S. Pat. No. 4,165,404 describes a process for producing coated laminates of knit or woven fabrics with a thick fluorinated copolymer sheet using an interlayer of low melt viscosity copolymer. The composites thus formed are not sufficiently flexible for use as garments, and are so structured as to be specifically suitable for molding rigid articles.

Fire resistant protective garments have been made from spun-laced Nomex. These materials have no chemical resistance, however, due to the open structure of the fabric. Previous efforts at coating Nomex spun-laced fabrics to achieve a material which is both chemical and fire resistant have resulted in loss of the flexibility necessary for clothing.

Accordingly, it is an object of the present invention to provide flexible composites which may be resistant to both fire and hazardous materials for use in protective garments and other articles such as covers and shelters. Fire resistant materials can be obtained using a fire resistant flexible substrate.

It is a further object of this invention to provide a method for seaming materials having a melt adhesive on both sides. This method uses heat sealed seams, or a combination of sewing and heat sealing. In the latter case, the sewn seam is never exposed to the challenge agent.

BRIEF SUMMARY OF THE INVENTION

A flexible and resistant composite is formed by laminating a thin fluoropolymer-containing film to one or both sides of a flexible substrate suitable for use as a garment, shelter or covering. The film component, or components where both sides of the substrate are laminated, are preferably each less than 5 mils thick. The film components according to the invention are suitable to provide the desired barrier properties at minimal thicknesses. Any adhesive used to join the laminate may be applied to either the substrate, or the fluoropolymer-containing film. Application of the adhesive to the film avoids permeation of nonwoven substrates to enhance the flexibility of the composites formed without diminishing the chemical resistance or barrier properties. The resulting material has good cohesive strength, and is highly flexible. When two layers of fluoropolymer are used, one on each side of the substrate, greatly increased chemical resistance is obtained. The composite materials produced according to the present invention are resistant to a broad spectrum of hazardous chemicals: volatile organics; organic and inorganic acids and bases; volatile solids; and inorganic and organic salts in solution.

The material of the present invention is well suited to the making of protective garments, such as hoods, coveralls, supplied-air suits, gloves, and footwear. The material is also suitable for use in respirators or other equipment, tents or other shelters, and in any other application where flexible, fire and chemical resistant materials are needed.

DETAILED DESCRIPTION OF THE INVENTION

According to the present invention, fire and chemical resistant materials are produced by laminating a fluoropolymer-containing film onto one or both sides of a flexible substrate. These materials retain their flexibility or suppleness and show improved resistance to chemical permeation and degradation. The resistance to chemicals is unexpectedly pronounced when double sided laminates are used. The barrier properties of double-sided composites are substantially enhanced over those of single-sided composites with the same total film thickness. Moreover, materials according to the present invention are not irreversibly contaminated by chemicals like nitrobenzene as are some elastomeric materials, such as butyl rubber and Viton, and can be cleaned. The materials according to this invention do not show loss of barrier properties upon decontamination.

The fluoropolymer-containing film used according to the present invention contains a fluoroelastomer, a perfluoroelastomer, a fluoroplastic, a perfluoroplastic, or a blend of fluoro- or perfluoroelastomers and fluoro- or perfluoroplastics. The preferred fluoropolymer is a fluoroplastic, preferably polytetrafluoroethylene (PTFE). Moreover, the film may comprise a blend of a fluoropolymer and a polyimide, a polyamide-imide, or a polyphenylene sulfide.

The term "fluoroplastic" as used herein encompasses both hydrogen-containing fluoroplastics and hydrogen-free perfluoroplastics, unless otherwise indicated. Fluoroplastic means polymers of general paraffinic structure which have some or all of the hydrogen replaced by fluorine, including, inter alia, polytetrafluoroethylene (PTFE), fluorinated ethylene propylene (FEP) copolymer, perfluoroalkoxy (PFA) resin, homopolymers of polychlorotrifluoroethylene (PCTFE) and its copolymers with TFE or VF₂, ethylene-chloro-trifluoroethylene (ECTFE) copolymer and its modifications, ethylenetetrafluoroethylene (ETFE) copolymer and its modifications, copolymers of TFE with pentafluoropropylene, polyvinylidene fluoride (PVDF), and polyvinylfluoride (PFV).

Similarly, the term "fluoroelastomer" as used herein shall encompas both hydrogen-containing fluoroelastomers as well as hydrogen-free perfluoroelastomers, unless otherwise indicated. Fluoroelastomer means any polymer with elastomeric behavior or a high degree of compliance containing one or more fluorinated monomers having ethylenic unsaturation, such as vinylidene fluoride, and one or more comonomers containing ethylenic unsaturation. The fluorinated monomer may be a perfluorinated mono-olefin, for example hexafluoropropylene, pentafluoropropylene, tetrafluoroethylene, and perfluoroalkyl vinyl ethers, e.g. perfluoro (methyl vinyl ether) or (propyl vinyl ether). The fluorinated monomer may be a partially fluorinated mono-olefin which may contain other substituents, e.g. chlorine or hydrogen. The mono-olefin is preferably a straight or branched chain compound having a terminal ethylenic double bond. The elastomer preferably consists of units derived from fluorine-containing monomers. Such other monomers include, for example, olefins having a terminal ethylenic double bond, especially ethylene and propylene. The elastomer will normally consist of carbon, hydrogen, oxygen and fluorine atoms.

Any fluoropolymer component may contain a functional group such as carboxylic and sulfonic acid and salts thereof, halogen, as well as a reactive hydrogen on a side chain.

Preferred elastomers are copolymers of vinylidene fluoride and at least one other fluorinated monomer, especially one or more of hexafluoropropylene, pentafluoropropylene, tetrafluoroethylene and chlorotrifluoroethylene. Commercially available fluoroelastomers include copolymers of vinylidene fluoride and hexafluoropropylene, such as Viton A, sold by DuPont; terpolymers of vinylidene fluoride, hexafluoropropylene and tetrafluoroethylene, such as Viton B sold by DuPont (and similar copolymers sold by 3M as FLUOREL, by Daiken as DAIEL, and by Montefluous as TECHNIFLON), and copolymers of vinylidene fluoride and chlorotrifluoroethylene, such as Kel-F sold by 3M. The use of AFLAS, which is a copolymer of TFE and propylene, as manufactured by Asahi, is also contemplated.

Preferred perfluoroelastomers include elastomeric copolymers of tetrafluoroethylene with perfluoro (alkyl vinyl) comonomers, such as hexafluoropropylene or perfluoro (alkyl ether) comonomers represented by

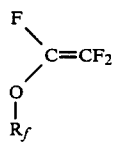

in which $R_f$ is a perfluoroalkyl or perfluoro (cyclo-oxa alkyl) moiety. Particularly preferred are the perfluorovinyl ethers in which $R_f$ is selected from the groups —CF₃, —C₃F₇,

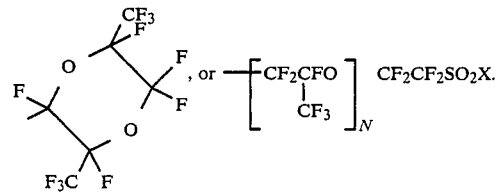

where N=1-4, X=H, Na, K or F. KALREZ, a copolymer of TFE and perfluoromethylvinyl ether (PMVE), or its modifications, is a particularly useful fluoroelastomer.

The term "polyimide" as used herein encompasses
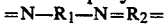
where $R_1$ is a diamide and $R_2$ is a dianhydride.

The term polyamide-imide as used herein encompasses

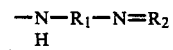

wherein $R_1$ and $R_2$ have the same meaning as above.

If desired, and as is well-known in the art, fillers or additives such as pigments, plasticizers, stabilizers, softeners, extenders, and the like, can be present in the film composition. For example, there can be present substances such as graphite, carbon black, titanium dioxide, alumina, alumina trihydrate, glass fibers, beads or microballoons, carbon fibers, magnesia, silica, asbestos, wall-astonite, mica, and the like.

The fluoropolymer-containing film, which may comprise one or more layers of varying content, is preferably prepared separately. The independent formation of the film permits development of a uniform, low stress, finely metered layer prepared specifically for subsequent application to the substrate. The most preferred technique for preparing the film is casting in preparation for decalcomania transfer or fusion roll lamination. In such a technique, the film is formed upon a support member which may be any dimensionally stable membrane, such as a metal foil, particularly aluminum foil, or a compatible polymeric film, such as skived PTFE or KAPTON polyimide film. Other techniques for film formation include melt extrusion or coextrusion and calendering. The lamination of a melt adhesive to the substrate with subsequent coating by the fluoropolymer film is contemplated.

The fluoropolymer-containing film components should preferably be less than 5 mil thick to result in composites of sufficiently flexibility for use in garments. Preferably such films will be 1-4 mil thick to achieve good protection and flexibility, and most preferably the film is 1-2 mil thick. It is understood that, for substrates laminated on both sides, where high flexibility is unnecessary in the finished article the film used may be of any suitable thickness.

Substrates used according to the invention may be any suitable flexible material capable of withstanding the conditions used to form the laminate. Examples of suitable substrates include, inter alia, glass, fiberglass, ceramics, graphite (carbon), PBI (polybenzimidazole), PTFE, polyaramides, such Kevlar and Nomex, metal such as copper or steel wire, polyolefins such Tyvek, polyesters such as Reemay, polyamides, polyimides, thermoplastics such as Kynar and Tefzel, polyphenylene sulfide, polyether oxides, polyether sulfones, polyether ketones, novoloid phenolic fibers such as Kynol, cotton, asbestos and other natural as well as synthetic textiles. The substrate may comprise a yarn, filament, monofilament, or other fibrous material either as such or assembled as a textile, or any woven, non-woven such as spun-laced, spun-bonded, or stitch-bonded, or knitted material. The substrate may alternatively comprise a film or paper. No treatment of the fabric is required, although coated fabrics may be employed if desired.

In making the resistant materials of the present invention, an adhesive is used, where necessary, to adhere the substrate to the desired film. A separate adhesive layer need not be used with films which are melt bondable, such as FEP or PFA. The adhesive may be applied to the film layer prior to lamination, or placed between the film and the substrate as a discreet layer and then laminated. Adhesive layers between 0.1 and 1.5 mil thick are suitable for use in this invention. In the case of woven or knit materials, the substrate may be coated with the adhesive prior to lamination. In the case of nonwoven substrates, coatings of adhesives may lead to a loss of flexibility due to impregnation of the substrate. The composites made according to the present invention avoid this difficulty and remain flexible.

If a melt adhesive is used, it can be fluoropolymer or a non-fluoropolymer, as long as the temperature required for melting is compatible with the laminating film and the substrate fabric. An FEP/Viton adhesive is particularly suitable. Materials which melt at low temperatures, such as TFB (Hoechst), may be used as films and as adhesives. This would allow the use of low melting temperature substrates such as polyolefins, polyesters and polyamides. PFA or PTFE may also be used as the melt adhesive.

In a preferred embodiment, a melt adhesive, preferably FEP/Viton, is applied to a 2 mil PTFE film for lamination to a fire-resistant substrate such as Nomex SL. The film is heat sealed to the substrate to produce a noncombustible chemically resistant composite.

A layer of PFA, FEP, or other low melting fluorinated polymer or blends thereof may optionally be added to the outside of the film.

The material produced according to this invention is useful for the construction of protective clothing, including hoods, footwear, coveralls, gloves, and supplied air suits. The material may also be used in shelters such as tents, coverings, and as equipment parts where a flexible chemical resistant material is needed.

In constructing the articles, pieces can be joined using any known seaming technique suitable for the end use of the article A preferred seaming technique for double-sided laminates with melt bondable exterior surfaces according to this invention involves stitching or heat sealing the edges to be joined and then heat sealing the seam to the inside of the garment

BRIEF DESCRIPTION OF THE DRAWINGS

FIG. 1 is a cross sectional view of a seam for a composite according to this invention during construction.

FIG. 2 is a cross-sectional view of a finished seam as shown in construction in FIG. 1.

Looking to FIG. 1, two pieces, (10) and (12) of composite material to be joined are placed with exterior surfaces (14) and (16) together, and the cut edges (18) and (20) superimposed. A seam is then made, parallel to the cut edges by heat sealing or stitching. The seam allowance (22) is then folded against the interior of the material (24) as shown in FIG. 2, and the seam is finally heat sealed. Any stitching used in the seam and the laminate edge are interior and not exposed to challenge agents. The permeation/penetration resistance and the tensile strength of the seamed area are equal to the base composite.

EXAMPLE 1

One side of a cast PTFE 2 mil film was coated with an adhesive which was a 50/50 blend of a dispersion of a fluoroelastomer (Dupont VTR 5307) and FEP (Dupont TE 9503). The adhesive coating thickness was 0.5 mil. The film was laminated to each side of a roll of Nomex Spunlace non-woven (2.7 oz./yd$^2$) in a continuous laminator having 4 heating zones and 5 pressurized nip rolls. The temperatures and pressures were as follows:

| Zone | 1 | 2 | 3 | 4 | 5 |
|---|---|---|---|---|---|
| Temp (°F.) | 400 | 500 | 550 | 550 | |
| Pressure (psi) | 0 | 5 | 15 | 40 | 50 |

The laminate's physical properties are in Table 1.

TABLE 1

| | MATERIAL PHYSICAL PROPERTY CHARACTERIZATION | | | |
|---|---|---|---|---|
| PROPERTY | TEST METHOD | EXAMPLE 1 | EXAMPLE 3 | EXAMPLE 5 |
| Weight (oz/yd) | ASTM D751-79 | 10.2 | 6.5 | 16.9 |
| Thickness (mil) | ASTM D751-79 | 15.2 | 14.6 | 18.4 |
| Tensile Strength (lbs./in.) | ASTM D751-79 | 46.0 (W) 29.8 (F) | 19.4 (W) 12.5 (F) | 218.5 (W) 184.5 (F) |
| Tear Strength (lb.) | ASTM D751-79 | 12.4 (W) 6.4 (F) | 9.5 (W) 7.5 (F) | 18.0 (W) 17.3 (F) |
| Bursting Strength (psi) | ASTM D751-79 | 125 | 102.5 | 443.3 |
| Abrasion Resistance (after 600 cycles) | FED. STD. 191-5302 | No loose fibers | No loose fibers | No loose fibers |
| Low Temperature Bend (−25° F.) | ASTM D2136-66 | Pass | Pass | Pass |
| Flammability | ASTM D568-68 | Non-burning | Non-burning | Non-burning |

EXAMPLE 2

The material produced in Example 1 was subjected to corrosive and hazardous challenge chemicals using the ASTM method F739-81 for permeation and penetration. Other materials were tested for comparison. The results of these tests are shown in Table 2.

In each instance, the laminate according to the present invention showed improved chemical resistance. In addition, the laminate exposed to nitrobenzene showed a substantial improvement in cleanability relative to butyl rubber. Nitrobenzene could be detected in the butyl rubber after cleaning, while in the laminate no nitrobenzene was detectable.

TABLE 2

| Chemical | Material | Breakthrough Time |
|---|---|---|
| Thionyl Chloride | Example 1 | 16 hrs. - no breakthrough |
| | 14 mil Butyl | 53 min. breakthrough |
| Fuming Nitric Acid 90% | Example 1 | 16 hrs. - no breakthrough |
| | | 2 hr. breakthrough |
| Nitrobenzene | Example 1 | 16 hrs. - no breakthrough |
| | 14 mil Butyl | 16 hrs. - no breakthrough |

EXAMPLE 3

The same procedure was followed as in Example 1 except that the film was laminated to one-side of the NOMEX SL. Physical properties of the resulting composite are given in Table 1.

EXAMPLE 4

Style 116 glass fabric (greige weight 3.2 oz./yd$^2$) was coated with two passes of VTR 5307 (Viton) to give a coated weight of 5.35 oz./yd$^2$. Then a coating of a 50/50 FEP/Viton blend was applied to the fabric, followed by a layer of TE 9503 (1.3 g/cm$^3$) FEP to give a total weight of 6.36 oz./yd$^2$. This material was laminated to 1 mil cast PTFE coated with a layer of FEP of approximately 0.1 mil. The static lamination conditions were 510° F. for 10 minutes at 70 psi and cooled under pressure.

The resulting composite was tested for chemical permeation and penetration by liquid and gases using ASTM F739-81 method. The results are shown in Table 3.

TABLE 3

| Chemical | Material | Breakthrough Time |
|---|---|---|
| Bromine | Example 4 | 16 hrs. - no breakthrough |
| | Neoprene | 5 min. breakthrough |
| | SARAN/TYVEK | 5 min. breakthrough |
| 65% Fuming Sulfuric | Example 4 | 16 hrs. - no breakthrough |
| | 14 mil Butyl | 6 hrs. breakthrough |
| Nitrobenzene | Example 4 | 16 hrs. - no breakthrough |
| | 14 mil Butyl | 16 hrs. - no breakthrough |

EXAMPLE 5

A composite was laminated of cast fluoropolymer film 0.0024") on both sides of a woven polyaramide substrate (Nomex 6.0 oz./yd$^2$). The cast fluoropolymer film consisted of a 2 mil film of PTFE coated on one side with a 50/50 FEP/Viton melt adhesive layer (0.3 mil), and on the other side with a layer of PFA (approximately 0.1 mil). In the lamination, the FEP/Viton melt adhesive side was in contact with the substrate.

Continuous laminator processing conditions were identical to those of Example 1. Physical properties of the resulting composite are shown in Table 1.

Permeation testing was performed by an independent testing organization in accordance with ASTM F731-79 on a battery of 16 challenge agents representing an extremely broad range of chemical families. The challenge agents tested are listed in Table 4. For each chemical tested, the laminated composite according to this invention showed no breakthrough at the end of the eight hour test period.

For comparison, literature values for testing of presently employed resistant materials showing breakthrough by some chemicals during the test period are also given in Table 4.

TABLE 4

BREAKTHROUGH TIMES (MIN.) OF CHEMICAL PROTECTIVE CLOTHING MATERIALS (ASTM F739-81)

| | | LITERATURE VALUES | | | |
|---|---|---|---|---|---|
| CHEMICAL | CHEMFAB EXAMPLE 5 | SARAN/TYVEK | CPE | VITON/ NEOPRENE | BUTYL NEOPRENE |
| ACETIC ACID | 480+ | 480+ | — | — | — |
| ACETONITRILE | 480+ | — | — | 45 | 480+ |
| CARBON DISULFIDE | 480+ | — | 8 | — | — |
| DIETHYLAMINE | 480+ | 44 | — | — | — |
| DIETHYLETHER | 480+ | — | — | — | — |
| DIMETHYL FORMAMIDE | 480+ | — | — | — | — |
| ETHYL ACRYLATE | 480+ | — | 24 | 12 | 60 |
| FREON TF | 480+ | — | — | — | — |
| HEXANE | 480+ | — | — | — | — |
| METHANOL | 480+ | — | — | 480+ | 480+ |
| METHYLE ETHYL KETONE | 480+ | 29 | — | 4 | 5 |
| NITROBENZENE | 480+ | — | 62 | — | — |
| SODIUM HYDROXIDE | 480+ | 480+ | — | — | — |
| SULFURIC ACID (FUMING) | 480+ | 37 | — | 480+ | 480+ |
| TETRAHYDROFURAN | 480+ | — | 12 | 7 | 10 |
| TOLUENE | 480+ | <5 | — | — | — |

— : No Information Available

EXAMPLE 6

An extruded thermoplastic fluoropolymer (FEP) film 0.001") was laminated to one side of a non-woven spunlaced polyaramide fabric. The FEP served as the melt adhesive as well as the film. Lamination was carried out in the continuous laminator under the following conditions.

| Zone | 1 | 2 | 3 | 4 | 5 |
|---|---|---|---|---|---|
| Temp (°F.) | 250 | 250 | 450 | 525 | |
| Pressure (psi) | 0 | 5 | 15 | 40 | 50 |

A flexible composite suitable for use in protective garments was produced.

EXAMPLE 7

An extruded thermoplastic fluoropolymer (FEP) film (0.001") was laminated to both sides of a non-woven spunlaced polyaramide fabric. The FEP served as the melt adhesive as well as the film. Lamination was carried out in the continuous laminator under the following conditions.

| Zone | 1 | 2 | 3 | 4 | 5 |
|---|---|---|---|---|---|
| Temp (°F.) | 250 | 250 | 450 | 525 | |
| Pressure (psi) | 0 | 5 | 15 | 40 | 50 |

A flexible composite suitable for use in protective garments was produced.

EXAMPLE 8

Heat sealed seams joining separate pieces of the fluoropolymer/polyaramide composite of Example 1 were made and tested. FIG. 1 shows a cross-section of the seam.

In forming the seam, the edges of the composite to be joined were placed together with the extension surfaces touching. The edges were then heat sealed together forming a T-seam. The seam allowance was then folded to lie against the interior of the composite and heat sealed in place.

The seam formed showed chemical resistance and tensile strength equal to the base composites. Results of testing for seam strength and chemical resistance are shown in Table 5.

EXAMPLE 9

A garment was constructed of the fluoropolymer/polyaramide composite described in Example 1. A protection factor of 60,000 was determined using a respirator quantitative fit test. In the test method, a person wearing the garment with an external air supply was placed in a test chamber where the atmospheric environment can be controlled and monitored. A known concentration of a contaminant (aerosol corn oil) was injected into the chamber. A probe on the interior of the garment in the facial region measured the concentration of corn oil which had permeated/penetrated the garment. The concentration at the probe was recorded as the occupant performed several specific exercises. The quantitative fit factor was calculated as the ratio of contaminant concentration in the external environment to the contaminant concentration at the interior probe. The high value indicates that composites according to this invention are suitable for use in protective garments.

EXAMPLE 10

A composite was laminated of cast Teflon film 0.002") to one side of a jersey knit polyaramide fabric (Kevlar). Processing conditions were identical to those of Example 1. The composite formed was suitable for use in protective garments and afforded better drape, lower resistance to deformation, and improved elasticity when compared to woven and non-woven laminates of comparable thickness.

TABLE 5

| Property | Testing of Seam Strength | | |
|---|---|---|---|
| | Test Method | Seam | Base Composite |
| Seam Strength (lbs/in) | ASTM D 751-79 | 29.5 | 29.8 |
| chemical penetration-breakthrough time (min) in fuming nitric acid | ASTM F 739-81 | 480+ | 480+ |

TABLE 5-continued

| Property | Testing of Seam Strength | | |
|---|---|---|---|
| | Test Method | Seam | Base Composite |
| acid | | | |

EXAMPLE 11

A composite was laminated of Teflon FEP (TYPE C) to one side of a polyaramide Nomex SL. A solvent-based acrylic interlayer (1.3 mil) was employed as the adhesive. The laminate was formed in a static press under light pressure (10 PSI) and ambient temperature. The composite was sewn into a hood assembly which would be appropriate for a self-contained breathing apparatus (SCBA) escape respirator. The seams of the article were bound with a tape (1.5 in.) of the same composite.

EXAMPLE 12

A double sided laminate was prepared using 1 mil PTFE film under the conditions of Example 1. This was compared with the single sided (2 mil) composite of Example 3 for resistance to fuming nitric acid. The double sided laminate showed no breakthrough in test periods up to 24 hours. The single sided laminate showed breakthrough after 180–200 minutes. Thus, the same total thickness of barrier film is substantially more effective in a double sided composite than in a single sided composite.

We claim:

1. A flexible chemically-resistant protective article having improved barrier properties made from a fluoropolymer laminate composite comprising a flexible fabric substrate and a protective coating lamintaed to at least one side of the said substrate with a melt-bondable fluoropolymer adhesive interlayer, said protective coating having a thickness of less than about 5 mil and comprising a fluoro polymer selected from the group consisting of polytetrafluoroethylene, fluorinated ethylene propylene copolymer, polychlorotrifluoroethylene, copolymers of chlorotrifluoroethylen and tetrafluoroethylene, copolymers of chlorotrifluorethylene and vinylidene fluoride, copolymers of ethylene and tetrafluoroethylene, chlorotrifluoroethylene, perfluoroalkyl vinyl ethers, polyvinylidenefluoride and polyvinylfluoride.

2. A protective article according to claim 1, wherein the substrate is formed from a material selected from the group consisting of glass, ceramics, graphite, polybenzimidazole, polytetafluoroethylene, polyaramides, metal wire, polyolefins, polyesters, polyamides, thermoplastics, polyether sulfones, polyether ketones, and cotton cloth.

3. A protective article according to claim 1, comprising clothing, a shelter or a covering.

4. A protective article according to claim 1, wherein the substrate and the article are fire resistant.

5. A protective article according to claim 4, comprising clothing, a shelter or a covering.

6. A protective article according to claim 1, wherein the adhesive interlayer comprises fluorinated ethylene propylene copolymer.

7. A protective article according to claim 6, wherein the adhesive interlayer further comprises a fluoroelastomer or a fluoroplastic.

8. A protective article according to claim 1, wherein the coating is a film.

9. A protective article according to claim 8, wherein the film further comprises a layer of perfluoroalkyl ether which forms an outer surface of the laminate.

10. A protective article according to claim 1, which is a garment and which comprises a perfluorinated tetrafluoroethylene-containing polymer laminated to at least one face of a substrate with a melt-bondable fluoropolymer adhesive interlayer.

11. A protective garment according to claim 10, wherein the fluoropolymer is polytetrafluoroethylene.

12. A protective garment according to claim 10, wherein the fluoropolymer is fluorinated ethylene propylene copolymer.

13. A protective garment according to claim 10, wherein the adhesive layer comprises fluorinated ethylene propylene copolymer.

14. A protective garment according to claim 13, wherein the adhesive layer further comprises a fluoroelastomer.

15. A protective garment according to claim 14, wherein the protective coating is a film further comprising a layer of perfluoroalkyl ether which forms an outer surface of the laminate.

16. A protective garment according to claim 15, wherein the substrate is a polyaramide textile.

* * * * *